Patented June 1, 1937

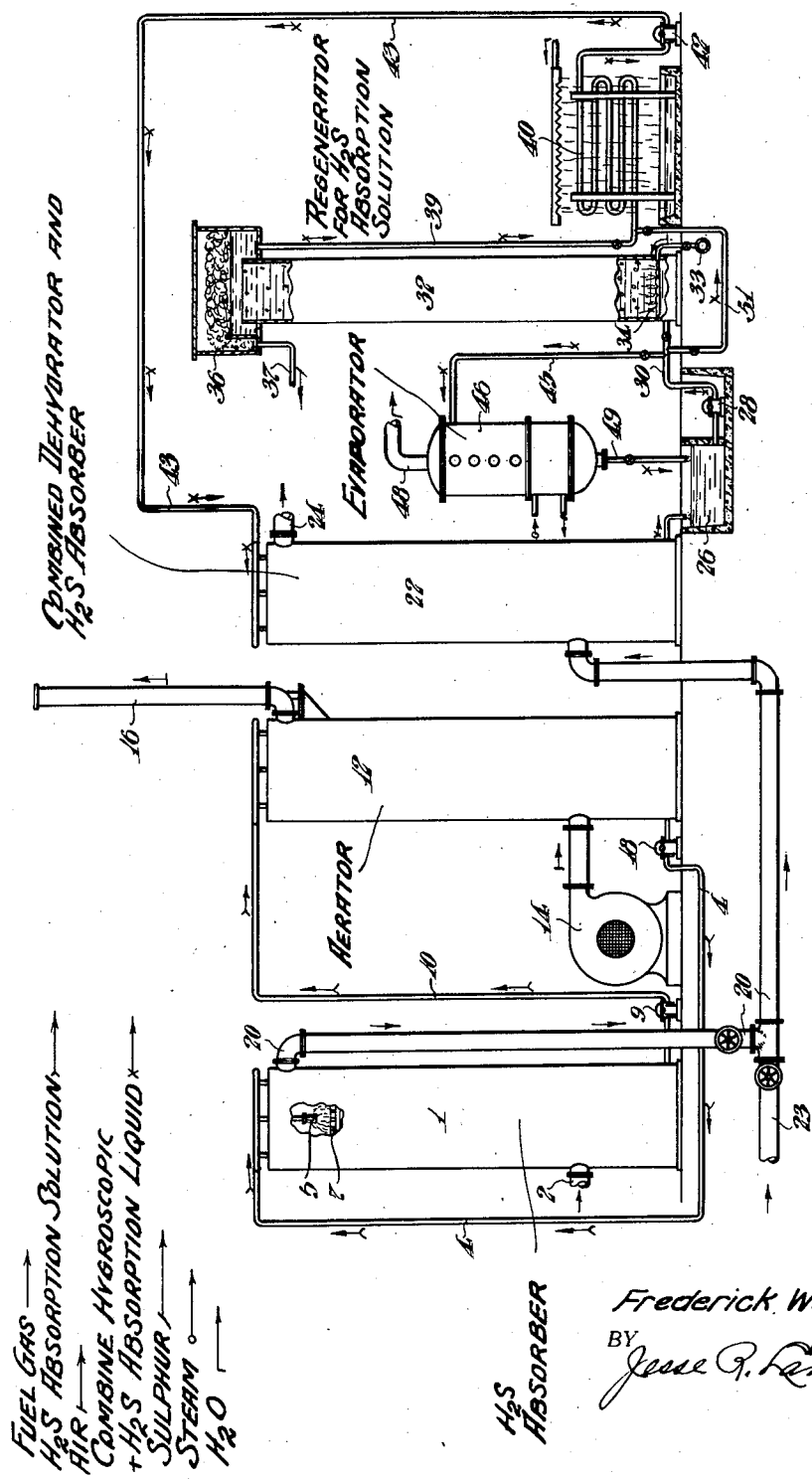

2,081,960

UNITED STATES PATENT OFFICE 2,081,960

TREATMENT OF GASES

Frederick W. Sperr, Jr., Ventnor, N. J., assignor, by mesne assignments, to Koppers Company, a corporation of Delaware Application October 28, 1931, Serial No. 571,511

4 Claims. (Cl. 23—3)

This invention relates to the treatment of fuel gases, such as coke oven gas, coal gas, water gas, mixed gas, and the like for the removal of hydrogen sulphide and water vapor therefrom. It relates more particularly to a process of treating fuel gases and the like in which dehydration of the gas and removal of hydrogen sulphide therefrom are simultaneously accomplished.

An object of my present invention is to provide a process wherein undesirable water vapor and acidic constituents such as $H_2S$ are economically removed from fuel gas and the like in a single scrubbing operation, and suitable apparatus therefor.

My invention has for further objects such other operative advantages and results as are found to obtain in the process and apparatus described and claimed herewith.

The removal of $H_2S$ from fuel gas and the like has in the past been accomplished in several ways. At many plants removal of the major portion at least of the $H_2S$ is effected by liquid purification processes in which the gas is scrubbed with a solution which absorbs $H_2S$ with or without absorbing other acidic constituents of the gas. The solution is then actified, as by treating it with gases such as air, or by subjecting it to the influence of an oxidizing agent, and the actified solution is recirculated to purify a further quantity of gas.

In some of these liquid purification processes the actification drives the $H_2S$ absorbed from the gas out of the solution, or converts it in part to salts which remain in the recirculated solution. In other processes the absorbent solution contains a reactive compound, such as a compound of iron, nickel, cobalt, manganese, or an element of the tin group of qualitative analysis, such as arsenic.

These reactive compounds may be dissolved or suspended in the absorbent solutions, and when such solutions are actified after being fouled or sulphided by absorption of $H_2S$, elemental sulphur is liberated and may be recovered by flotation, filtration, or other suitable means. Gas purification processes in which sulphur is liberated in elemental form during actification are known as sulphur recovery processes. Among the best known and most successful of these are the so-called "Ferrox" process, the "Thylox" process, and the "Nickel" process.

Some of these liquid purification processes are highly efficient and remove 90% to 95% or more of the $H_2S$ from the gas treated. It is usually desirable, however, to pass the purified gas through iron oxide or some other purifying material to remove the last traces of $H_2S$ before distribution or utilization of the gas.

Removal of $H_2S$ by processes known to the prior art does not in most instances appreciably affect the moisture content of the gas and the purified gas is usually saturated with water at the temperature prevailing during purification. This water is not usually troublesome as long as it remains in the gas, but when it is condensed from the gas it accelerates corrosion of gas mains and other equipment, and in cold weather it may be the cause of freezing drips and other difficulties. Consequently, it has been found advisable in many instances to partially dehydrate gas prior to distribution.

Complete dehydration of the gas is not usually desirable, but it has been found that gas dehydrated to such extent that its dew point with respect to water is just below the lowest temperature encountered during distribution is generally most economical to distribute. Several processes have been devised whereby gas is economically dehydrated to the desired extent, such as the process described in U. S. Patent No. 1,614,347 to Cooper and Henshaw and the process described in the copending application of H. A. Gollmar, Serial No. 305,333, filed Sept. 11, 1928, now Patent No. 1,861,268 issued May 31, 1932.

In the practice of my present invention I obtain the desirable results which previously required several separate treatments of the gas in separate scrubbers or absorbers and usually with different materials, and I may obtain these results by a single simple scrubbing of the gas. The economic advantages of this improvement are obvious, as it makes possible both the removal of $H_2S$ and the desired dehydration of gas with little, if any, more ground space, apparatus, and operating labor than was previously necessary for either step alone.

My invention contemplates the treatment of gas containing $H_2S$ and water vapor with a hygroscopic solution containing material which reacts with $H_2S$. Such reactive material may merely cause the $H_2S$ to be absorbed in the solution or it may react with $H_2S$ to form compounds which are decomposed by aeration to liberate $H_2S$, free sulphur or the like, or it may permanently decompose the $H_2S$ or combine with it to form stable compounds. The hygroscopic solution itself may react with $H_2S$ so that no additional material or reagent is necessary, or I may add reagents such as the compounds employed in the sulphur recovery liquid purification processes, or other reagents which react with $H_2S$, such as hypochlorites, for example.

My process is not limited in application to gas of any particular $H_2S$ content or moisture content, either before or after treatment. I may treat gas with a relatively high or relatively low content of either or both $H_2S$ and water according to the process of my present invention, and the treated gas may be substantially completely free from $H_2S$ or water or both.

I prefer, however, to employ my process for the removal of the last traces of $H_2S$ from gas and the simultaneous removal of water therefrom to such extent that the dew point of the treated gas is lower than temperatures encountered in the gas distributing system, thus making unnecessary the cumbersome and extensive iron oxide catch boxes which are generally employed.

I have found that several different solutions and suspensions are suitable for use in the practice of my invention. For example, I may employ a strong solution of sodium thiocyanate (NaSCN), calcium chloride ($CaCl_2$), magnesium chloride ($MgCl_2$), or potassium carbonate ($K_2CO_3$) as the hygroscopic agent, and to this I may add a compound of iron, nickel, cobalt, manganese, arsenic, or the like, or other compounds or materials which react with $H_2S$ and/or facilitate its removal from the gas. I may also add materials which increase the alkalinity of the solution.

As a preferred combination for the purposes of the present invention I may scrub the gas with a strong solution of sodium thiocyanate containing an alkaline ingredient and an iron compound. The solution may or may not contain sodium thiosulphate up to the saturation point, and the concentration of NaSCN in solution may be varied according to the amount of water to be removed from the gas, the desired dew point of the gas after treatment, and the temperature at which the gas is to be scrubbed. The NaSCN content may be 600 to 650 grams per liter, for example.

The alkaline ingredient may be any stable compound having an alkaline reaction, such as sodium hydroxide, sodium carbonate, sodium bicarbonate, sodium sulphide, sodium hydrosulphide, and similar compounds of ammonia, potassium, calcium or magnesium. The alkalinity of the solution may vary from zero up to saturation with the alkaline compound employed, but in most instances I prefer to maintain an alkalinity equivalent to from 0.2% to 1.5% $Na_2CO_3$. The iron compound may be any ferrous or ferric compound, although ferric compounds are usually preferable, and it may be soluble or insoluble in the solution. I have found that the preferred concentration of iron in the solution is from a trace to 1.5%, determined as $Fe_2O_3$.

Instead of the iron compound I may employ a nickel compound. Any soluble nickel salt can be used, such as nickel sulphate, or I may use an insoluble nickel compound in suspension, such as nickel oxide, hydroxide, sulphide, etc. Any amount of nickel can be used, but the most practical concentration is from a trace to 0.5% by weight.

As a further alternative I may use cobalt compounds instead of compounds of iron or nickel. These cobalt compounds may be soluble, such as cobalt chloride and acetate, or they may be insoluble, as in the case of cobalt oxide, hydroxide, sulphide, etc. I may also use any amount of cobalt but I have found it preferable to maintain the concentration of cobalt between a trace and 0.5% Co, by weight. Manganese compounds may be employed in a manner similar to that described for iron, nickel, or cobalt.

Instead of using sodium thiocyanate solution as the hygroscopic agent I may use a strong solution of calcium chloride. This solution may be neutral or it may contain a small amount of an alkaline ingredient, such as one of the compounds mentioned hereinabove. When these alkaline agents are used, however, they are preferably added in such amount that the alkalinity is not increased to a point where calcium carbonate or other calcium compounds are precipitated from the $CaCl_2$ solution during or after contact with the gas.

As an agent for the removal of $H_2S$, I may use compounds of iron, manganese, nickel, and cobalt of the kinds and amounts specified for use with sodium thiocyanate. The advantage of this modification is that calcium chloride is cheaper and more available in some localities than sodium thiocyanate. On the other hand, calcium chloride solutions have a lower capacity for absorbing $H_2S$ because of the low alkalinity necessarily maintained. This is not a serious disadvantage in the removal of small amounts of $H_2S$, such as the last few grains removed in the preferred application of my present process.

Instead of calcium chloride solution I may use a strong solution of magnesium chloride containing a compound of iron, manganese, nickel, or cobalt in solution or in suspension. The solution may be neutral or slightly alkaline, but the alkalinity should not be sufficient to cause the precipitation of $Mg(OH)_2$, $MgCO_3$, etc., from the solution. It is sometimes desirable to add ammonium chloride to the solution to prevent this precipitation.

The advantages and disadvantages inherent in the use of magnesium chloride solutions are similar to those obtaining when calcium chloride is used. It is sometimes possible to maintain a higher alkalinity when magnesium chloride is used than when calcium chloride is used, however, and the solution therefore has a greater capacity for absorption of $H_2S$.

As a further alternative I may use a strong solution of potassium carbonate containing a suitable compound of iron, nickel or cobalt in solution or suspension. The solution may or may not also contain appreciable amounts of potassium bicarbonate. I have found that the amount of potassium bicarbonate formed by absorption of $CO_2$ from coke oven gas for example, which usually contains from 2% to 2½% $CO_2$, is not sufficient to materially reduce the hygroscopic effect of the solution.

An advantage resulting from the use of potassium carbonate solution is the rapid absorption of $H_2S$ obtained because of the high alkalinity of the solution. This modification is chiefly applicable in localities where the cost of $K_2CO_3$ is not so high as to be prohibitive. In most instances, sulphur is not liberated on actification of this solution, and therefore sulphur removal equipment for the actifying stage is not usually required.

As a still further modification, I may use strong solutions of calcium chloride or magnesium chloride containing dissolved chlorine or a hypochlorite or a similar compound which destroys or permanently removes $H_2S$. Hypochlorites and the like are destroyed or consumed along with the $H_2S$ in this process, and no actifying stage is needed. The solution is simply recirculated, with periodic or continuous additions of hypochlorite or the like, and of suitable alkaline material if desired.

This modification may be somewhat expensive for the removal of large amounts of $H_2S$, but it is very satisfactory for the removal of small amounts. It is particularly adapted to the treatment of gases which do not contain ethylene and similar unsaturates with which chlorine, hypochlorites, and the like react, and is especially well suited to the treatment of blue gas, natural gas, etc. which are substantially free from these compounds.

Solutions of potassium carbonate containing chlorine, hypochlorites and the like may also be used, but in that case the $K_2CO_3$ is also consumed to a certain extent, and additions must be made to replace the quantity consumed.

I have found that in many instances a very suitable solution is prepared from a strong solution of sodium thiocyanate, which may also contain thiosulphate, and a dissolved arsenic compound. One advantage of this solution is that all of the active ingredients are in solution and there is therefore no sedimentation trouble such as frequently occurs when a suspension is circulated.

In this modification it is preferable to add the arsenic in the form of a soluble compound, such as sodium arsenate, and it may be necessary to keep the solution agitated until the more soluble thioarsenates are formed by absorption of $H_2S$ from the gas. The alkalinity of the solution should be such that the principles of the Thylox process are operative.

I may also use arsenic compounds with strong solutions of $CaCl_2$ and $MgCl_2$ in the practice of my invention. In that case the arsenic compound is preferably added in the form of a thioarsenate so that soluble compounds are immediately formed. Arsenites, arsenates, and $As_2O_3$, form insoluble calcium (or magnesium) arsenate or arsenite which precipitates, but the calcium and magnesium thioarsenates are soluble in water and remain in solution.

In the practice of my invention a solution or suspension such as one of those described hereinabove is preferably recirculated through a gas scrubber or absorbing stage, a thionizer or other actifying stage, and a cooler. It is also necessary to employ an evaporator to maintain the desired concentration of the hygroscopic agent in the liquid.

The necessary evaporation can be effected by intermittent concentration of part or all of the solution in the system, or by continuous concentration of part of the solution. Any type of scrubber may be used in which the gas is brought into intimate contact with the scrubbing solution. For example, a hurdle packed tower of the type ordinarily used in gas purification processes is generally suitable.

The thionizer may be of any type suitable to actify the fouled solution containing $H_2S$. In general, I prefer to use a pressure thionizer of the type employed in the usual sulphur recovery liquid purification processes, but I may also use a tube thionizer or a flotation machine in those modifications of my process in which sulphur is recovered, or I may use an actifying tower similar to the type employed in the so-called "Seaboard" process of purification in modifications in which sulphur is not recovered. In general, I may use any device suitable for bringing the solution into intimate contact with oxygen or an oxygen-containing gas.

The actified and concentrated solution must usually be cooled before its return to the absorbing stage to keep the liquor from becoming too warm and thereby losing part of its ability to remove water from gas. The latent heat of vaporization of the water vapor absorbed from the gas is released and heats the solution, and a cooler is necessary to abstract this heat.

The temperature to which the solution must be cooled before its return to the scrubbing stage depends on the concentration of the solution with respect to the hygroscopic agent and the desired dew point of the treated gas. Satisfactory results are generally obtained when the temperature and concentration of the hygroscopic liquid are such that the dew point of the scrubbed gas is 25° or 30° F. below the scrubbing temperature.

I will now describe with reference to the accompanying drawing a preferred method of practicing my improved process of treating fuel gas and the like for the removal of water and acidic constituents, especially $H_2S$. In the drawing, The single figure is a partially diagrammatic view in elevation, with parts broken away, of apparatus suitable for the practice of my present invention.

Fuel gas containing $H_2S$ enters an absorber 1 from a pipe 2. Purifying solution, such as a solution of sodium carbonate with or without a catalyst for sulphur recovery is delivered to the absorber through a pipe 4 and sprays or other distributing devices 5, which distribute it over the packing material, such as wooden hurdles 7 with which the interior of the absorber is packed. This solution passes downwardly through the absorber in counter current with the upward flow of gas and absorbs $H_2S$ from the gas, thereby becoming fouled or sulphided.

The fouled solution is withdrawn from the bottom of the absorber 1 and delivered by a pump 9 through a pipe 10 to an actifier 12 or other suitable regenerating device. Air is introduced near the bottom of the actifier by a blower 14 and passes upwardly through the actifier in countercurrent with the descending solution from which it removes $H_2S$. The actifier air containing $H_2S$ removed from the gas leaves the actifier through a stack 16 to be wasted or consumed as fuel, or for other disposition.

When a sulphur recovery catalyst is employed the actification liberates elemental sulphur, and apparatus for separating this sulphur from the solution must be provided.

The actified solution is returned from the bottom of the actifier 12 by a pump 18 through pipe 4 to the absorber 1, wherein it removes $H_2S$ from a further quantity of gas. Partially purified gas passes from the absorber 1 through a pipe 20, which delivers it to an absorber 22 wherein treatment of the gas according to my present invention is applied.

The preliminary purification of the gas in the absorber 1 is not always a necessary part of my present invention and may be accomplished in any of the methods known to the prior art, or it may be omitted. In many instances satisfactory results are obtained by passing the gas, which is preferably previously freed from tar and ammonia, directly to the absorber 22, as through pipes 23 and 20, without any previous treatment for the removal of $H_2S$.

In the absorber 22 gas is scrubbed with a liquid, such as one of the solutions or suspensions described hereinabove, whereby remaining H₂S and part of its water vapor content are removed. For example, a strong solution of NaSCN containing an alkaline ingredient and a compound of iron, nickel, cobalt, or arsenic may be employed. This solution absorbs the H₂S remaining in the gas and also absorbs water vapor from the gas to such an extent that the dew point of the treated gas is lower than temperatures encountered during its subsequent distribution and utilization.

Purified gas substantially free from H₂S and containing only such a quantity of water vapor that substantially no condensation will take place during distribution passes from the absorber 22 through pipe 24 to a storage holder or distributing system or other place of disposal. Fouled solution containing H₂S and water vapor absorbed from the gas passes from the bottom of the scrubber 22 into a circulating tank or sump 26 or other suitable storage means. From this sump the fouled solution is withdrawn by a pump 28 and delivered through a pipe 30 to the actifying stage, which preferably comprises a pressure thionizer 32.

The solution passes upwardly through the thionizer concurrently with air or other oxygen-containing gas introduced from a pipe 33 through a perforated pipe 34 or other suitable distributing means. The solution is thereby actified and elemental sulphur is liberated in the form of a froth which separates from the solution in a separating chamber 36 forming the upper part of the thionizer 32. Sulphur froth or slurry is withdrawn through a pipe 37 to be treated for recovery of the sulphur, as by filtration or other suitable means.

Actified solution passes through a pipe 39 to a cooler 40 of any suitable type, wherein the temperature of the solution is reduced to the desired scrubbing temperature. The cooled solution is then returned as by a pump 42 and pipe 43 to the absorber 22, wherein it absorbs H₂S and water vapor from a further quantity of gas.

Part of the solution withdrawn from the sump 26 by pump 28 passes from pipe 30 through pipe 45 into an evaporator 46. This evaporator may be of any suitable type and the solution is concentrated therein by removal of water at atmospheric or reduced pressures.

The water vapor removed from the solution passes from the evaporator through a vapor outlet 48 which may or may not be connected to a vacuum pump and/or a condenser, and concentrated solution returns from the bottom of the evaporator through a pipe 49 to the sump 26. The amount of solution passed through the evaporator 46 is regulated, as by adjusting valves in pipes 30 and 45, so that the concentration of the hygroscopic agent in the solution recirculated over the absorber 22 remains at the desired point.

When the solution employed in my process is such that sulphur is not recovered during actification, the sulphur recovery apparatus may be omitted, or some other type of actifier such as the actifier 12 previously described may be substituted for the pressure thionizer 32.

When no actification is necessary, as when chlorine, hypochlorites, or the like are employed to react with the H₂S in the gas, the actification stage may be omitted entirely and the solution passes from pipe 30 through a pipe 51 to the cooler 40, from which it is recirculated by the pump 42 over the absorber 22 as before. Part of the solution is continuously or periodically passed through the evaporator 46, however, as in the previous cases.

As shown in the foregoing description, I may employ a considerable variety of solutions in the practice of my invention in accordance with the preferred method of operation described hereinabove. It will also be obvious to those skilled in the art that various changes in the several parts of my apparatus and the several steps of my process, in addition to those described, can be made without departing from the spirit of my invention. It is my intention to cover in the claims such modifications as are included within the scope thereof.

I claim as my invention:

1. The process of dehydrating fuel gas and concurrently purifying it of hydrogen sulphide which comprises: scrubbing the gas while containing hydrogen sulphide and moisture with an alkaline hygroscopic solution containing a compound of a metal whose sulphide is normally insoluble so as to purify the gas of H₂S by absorption thereof and concurrently in a single scrubbing step dehydrate the fuel gas to the extent required to deliver the gas into municipal systems at a dew point lower than the temperatures encountered in the gas distribution system, the solution having both an affinity for the moisture of the gas and also an initial affinity for the sulphur of the hydrogen sulphide of the gas and the metal compound having an affinity for the sulphur absorbed by the liquid whereby the alkaline hygroscopic solution acts as a carrier of the sulphur from the gas to the metal compound as well as a dehydrating agent.

2. The process of dehydrating fuel gas and concurrently purifying it of hydrogen sulphide which comprises: scrubbing the gas while containing hydrogen sulphide and moisture with a hygroscopic solution containing dissolved alkali to absorb sulphur from the gas and also containing a compound of a metal the sulphide of which is normally insoluble, so as to purify the gas of H₂S by absorption thereof and concurrently in a single scrubbing step dehydrate the fuel gas to the extent required to deliver the gas into municipal systems at a dew point lower than the temperatures encountered in the gas distribution system, the solution having a hygroscopic agent for moisture removal as well as alkali having an initial affinity for the sulphur of the gas and the metal compound having an affinity for the sulphur absorbed by the alkali whereby the alkaline hygroscopic solution acts as a carrier of the sulphur from the gas to the metal compound as well as a dehydrating agent.

3. The process of dehydrating fuel gas and concurrently purifying it of hydrogen sulphide which comprises: scrubbing the gas while containing hydrogen sulphide and moisture with a hygroscopic strong solution of sodium thiocyanate containing an arsenic compound which reacts with the H₂S in the gas to form a compound which liberates elemental sulphur upon aeration and containing an alkaline compound favoring the absorption of H₂S, so as to purify the gas of H₂S by absorption thereof and concurrently in a single scrubbing step dehydrate the fuel gas to the extent required to deliver the gas into municipal systems at a dew point lower than the temperatures encountered in the gas distribution system.

4. The process of dehydrating fuel gas and concurrently purifying it of hydrogen sulphide which comprises: scrubbing the gas while containing hydrogen sulphide and moisture with a hygroscopic strong solution of sodium thiocyanate containing an iron compound which reacts with the $H_2S$ in the gas to form a compound which liberates elemental sulphur upon aeration and containing an alkaline compound favoring the absorption of $H_2S$, so as to purify the gas of $H_2S$ by absorption thereof and concurrently in a single scrubbing step dehydrate the fuel gas to the extent required to deliver the gas into municipal systems at a dew point lower than the temperatures encountered in the gas distribution system.

FREDERICK W. SPERR, Jr.